Sept. 7, 1943.  A. WEIL  2,328,591
ROACH RUN
Filed Nov. 8, 1941  3 Sheets-Sheet 1
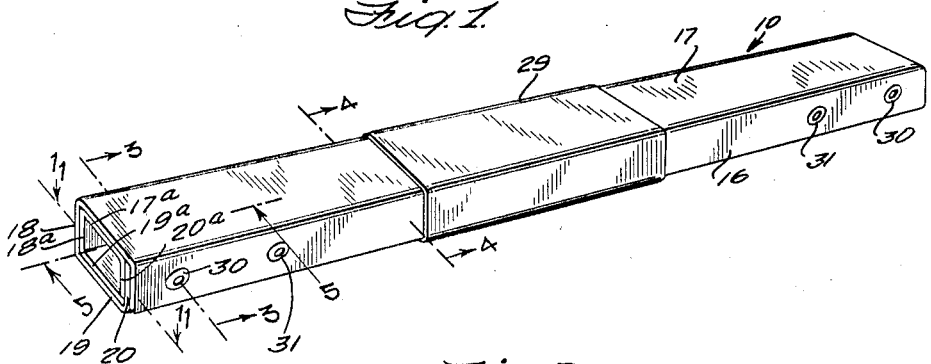
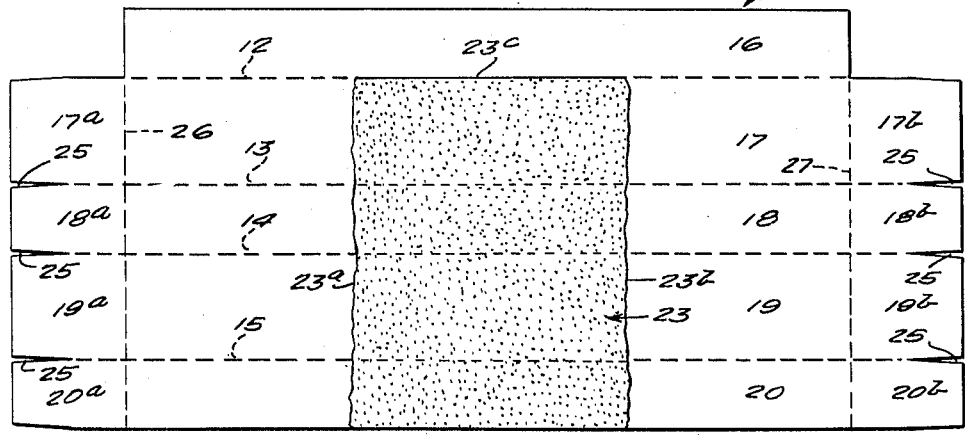
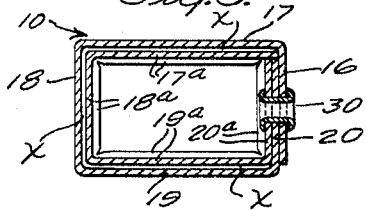
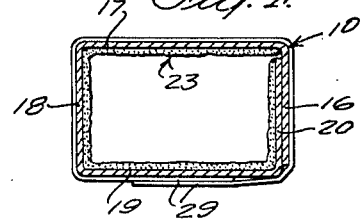
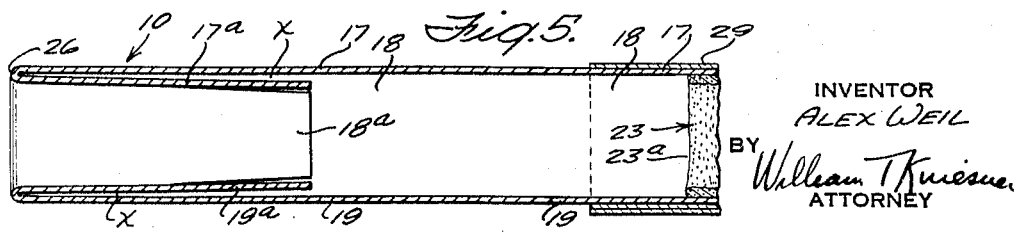
INVENTOR
ALEX WEIL
BY
William T. Kniesner
ATTORNEY Sept. 7, 1943.    A. WEIL    2,328,591
ROACH RUN
Filed Nov. 8, 1941    3 Sheets-Sheet 2
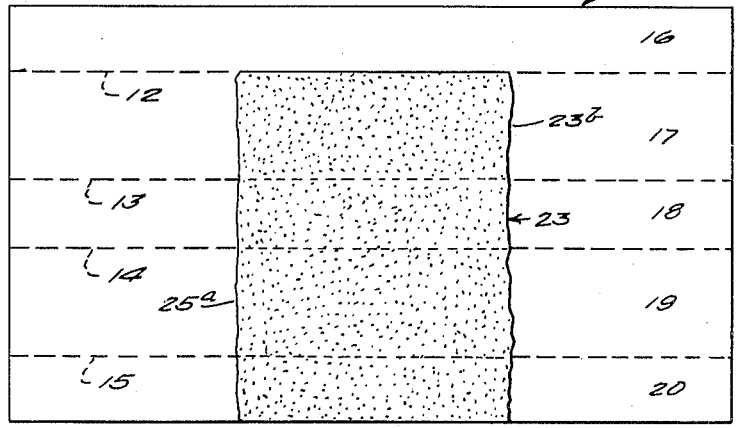
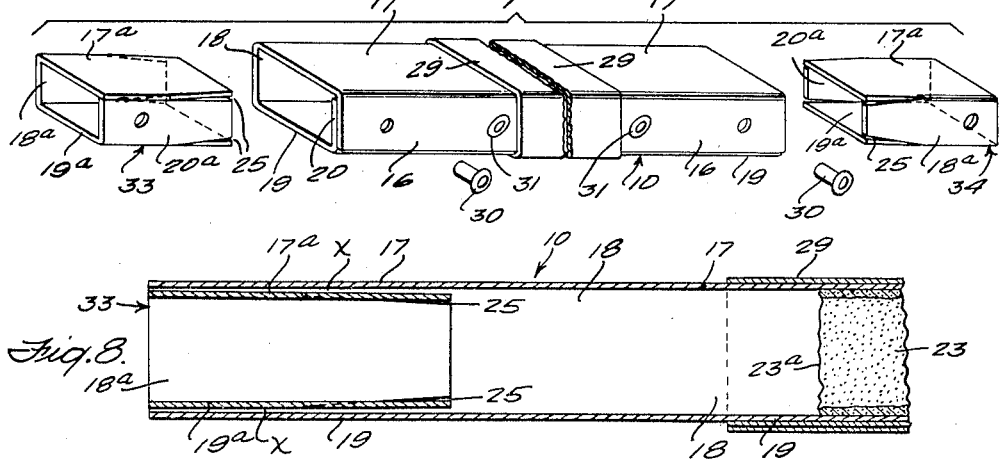
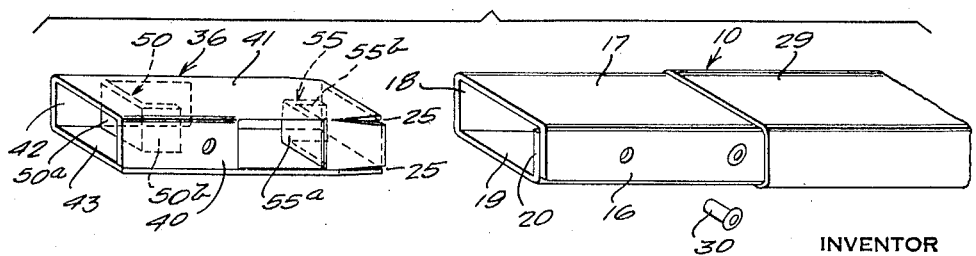
INVENTOR
ALEX WEIL
BY
William T. Kiesner
ATTORNEY Sept. 7, 1943.　　　　　A. WEIL　　　　　2,328,591
ROACH RUN
Filed Nov. 8, 1941　　　3 Sheets-Sheet 3
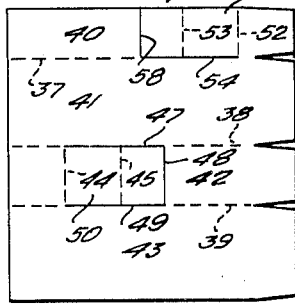
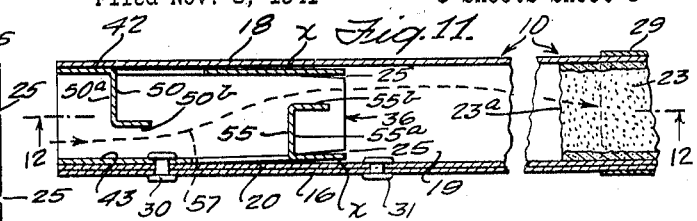
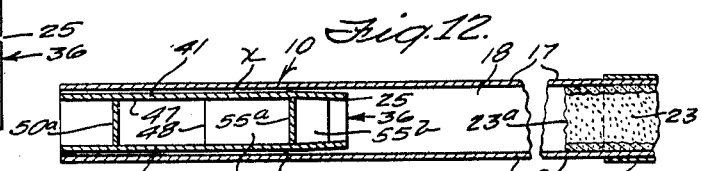
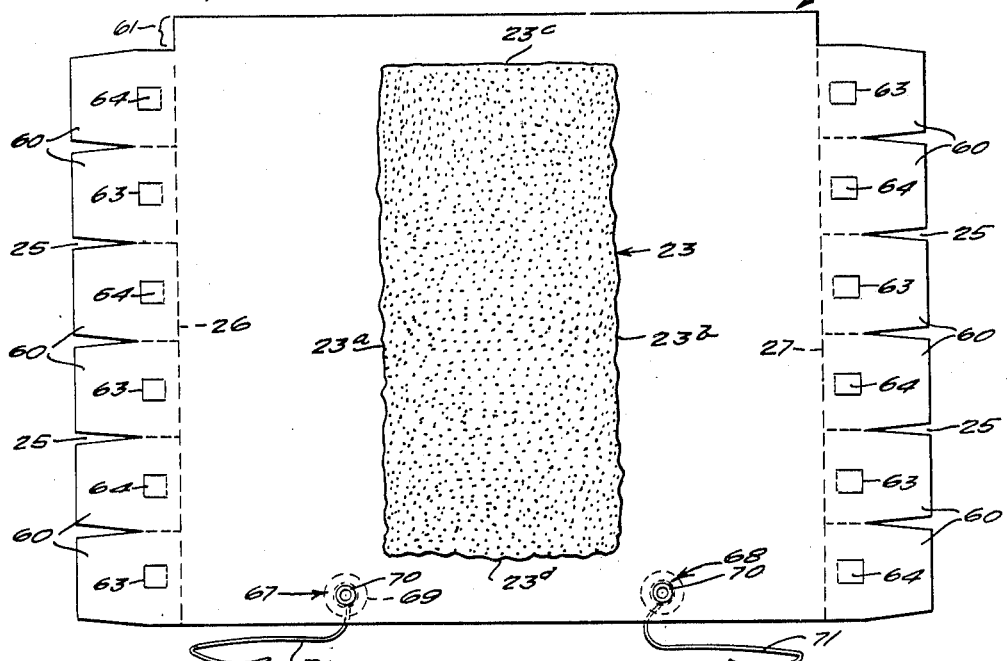
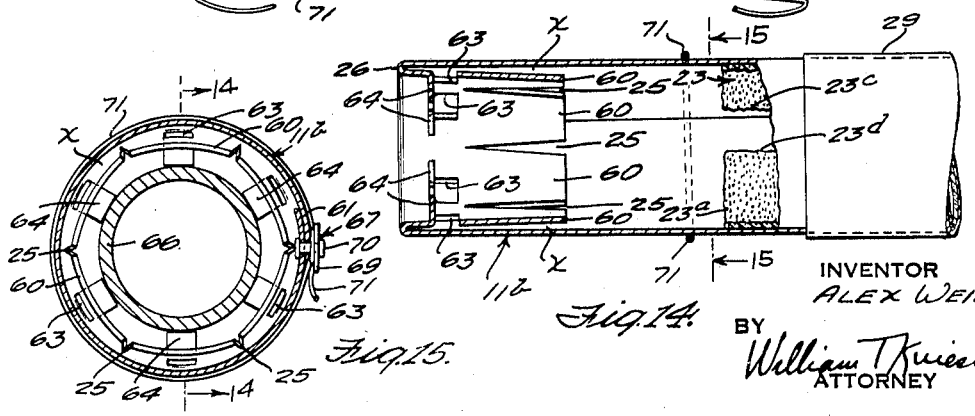
INVENTOR
ALEX WEIL
BY William T. Kniesner
ATTORNEY Patented Sept. 7, 1943

2,328,591

UNITED STATES PATENT OFFICE 2,328,591

ROACH RUN

Alex Weil, New York, N. Y.

Application November 8, 1941, Serial No. 418,276

19 Claims. (Cl. 43—131)

This invention relates to the extermination of roaming or crawling insects, such as roaches.

This application is a continuation in part of my application, Serial No. 390,449, filed April 26, 1941.

One of the objects of this invention is to provide a simple and practical device, capable of inexpensive manufacture, for attracting or luring insects of the above-mentioned nature to a poisonous life-destroying substance. Another object is to provide a device of the above-mentioned character that will provide a natural attraction to such insects, irrespective of whether or not the poisonous substance contained in it functions as a lure and irrespective of whether or not it contains some other lure. Another object is to provide a device of the above-mentioned nature that will be capable of functioning as above indicated throughout a wide variety of circumstances or conditions, and still present to such insects a close simulation of physical environments which they by nature use as hiding places, runs, living or breeding quarters or the like. Another object is to provide a device of the above-mentioned character that will be of dependable and inexpensive construction, easy, simple and safe to handle, and capable of low cost quantity production and safe and simple in use or application on the part of the public.

Another object is to provide a construction for containing a life-destroying poisonous substance or deposit in which, without detrimentally affecting the achievement of such objects as those noted above, access to the poisonous substance or deposit by others, such as humans, domestic animals or pets or the like, is reliably guarded against. Another object is to provide a device of the above-mentioned character in which retention of the poisonous substance or deposit against its discharge from the device may be achieved in a simple and dependable manner. Another object is to provide a device of the above-mentioned character which, while containing a poisonous material, may be used with adequate safety as against poisoning or contaminating humans, animals, foodstuffs, objects or the like.

Another object is to provide a device of the above-mentioned character which will in a simple, efficient, safe and reliable way provide or insure internally an adequate darkness in the device simulating or approximating physically the darkness and environment of places or regions which the insects frequent by preference, and yet expose to the insects the poisonous material without danger of loss of the material from within the device and free from material risk of access thereto by others than the insects themselves. Another object is to provide a device of the above-mentioned character that may be constructed inexpensively, yet be of reliable and efficient action and strong and durable and safe in use. Another object is to provide a device of the above-mentioned nature that will dependably permit of a wide range or flexibility of locating or positioning the device in practice. Another object is in general to provide an improved construction for destroying roaming or crawling insect pests, such as roaches. Other objects will be in part obvious or in part pointed out hereinafter.

The invention, accordingly, consists in the features of construction, combinations of elements, and arrangements of parts as will be exemplified in the structure to be hereinafter described and the scope of the application of which will be indicated in the following claims.

In the accompanying drawings in which are shown several of various possible embodiments of this invention, Figure 1 is a perspective view, on a small scale, of one form of device embodying certain features of my invention and showing the device as it would be placed or laid down on a supporting surface, such as a floor, table or the like, in actual use;

Figure 2 is a development of a possible conformation of a blank that may be used in making one of the various embodiments, herein selected for illustration, of my invention and shows also the application of a poisonous material to the blank before the latter is folded into a tubular form;

Figures 3 and 4 are transverse sectional views as seen, respectively, along the lines 3—3 and 4—4 of Figure 1;

Figure 5 is a fragmentary or partial longitudinal sectional view of the blank of Figure 2 after the blank has been folded into a tubular form;

Figure 6 is a development of another form of blank that may be used in making up the device of Figure 1 and shows the application of a poisonous material to the blank before the latter is folded into tubular form;

Figure 7 is an exploded perspective view showing certain parts, including the blank of Figure 6, in subsequent stages of construction and ready for assembly;

Figure 8 is a longitudinal sectional view as seen along the line 5—5 of Figure 1, showing certain features of construction of this other form;

Figure 9 is an exploded perspective showing certain of the parts, including the blank of Figure 6, for making up an improved modification of the device of Figure 1;

Figure 10 is a plan view of a blank used in making up one of the parts of Figure 9;

Figure 11 is a horizontal sectional view of this modification as seen along the line 11—11 of Figure 1;

Figure 12 is a fragmentary or partial longitudinal sectional view of this modification as seen in a vertical plane taken along the line 12—12 of Figure 11;

Figure 13 is a plan view of a part of another form of the device in one stage of construction, showing also in development the shape of a blank that may be employed;

Figure 14 is a fragmentary or partial central vertical sectional view as seen along the line 14—14 of Figure 15, but with a part omitted, showing the device of Figure 13 in completed form; and Figure 15 is a transverse sectional view, on a larger scale, of the device as seen along the line 15—15 of Figure 14, and showing the device as applied to, for example, an existing pipe line.

Similar reference characters refer to similar parts throughout the several views of the drawings.

Referring first to Figure 1 of the drawings, the device generally indicated by the reference character 10 and to which I hereinafter refer to at times as a "roach run," I preferably construct out of a suitable sheet material such as, preferably, a cardboard of suitable strength or stiffness, sheet fibre, or the like, and give it internally a relatively very small transverse cross-section and relatively great length, in relation to the particular insect to be dealt with, and for purposes of best illustration let it be assumed that the insect is a roach. With such proportions, certain functions and related structural features of which are hereinafter set forth, a preferred cross-sectional shape is rectangular as appears from Figure 1, but it will be understood that that is illustrative and not by way of limitation; where rectangular in cross-section and intended for roaches, illustrative and preferred dimensions of the device may be an overall length on the order of 9" with an internal width of about ⅞" and internal height of about ½".

When made of cardboard, the device 10 may comprise a blank like that generally indicated by the reference character 11 in Figure 2, the blank being provided with longitudinal score lines 12, 13, 14 and 15, thus providing five panels 16, 17, 18, 19 and 20, of which the first and last panels 16 and 20, when the blank is folded about the score lines, overlap each other and by which, preferably, upon securing the overlapping panels 16 and 20 together, the long small-cross-section tube-like structure above mentioned retains its form.

Preferably, before converting the blank into the just-stated tube-like conformation, I apply to what is to be the internal face of the structure 10, but only throughout a central restricted band or area the poisonous composition which, and also as to its area of application, is indicated in Figure 2 by the reference character 23. It is applied, preferably, to the faces of the four panels that are exposed to the interior of the structure 10, but its terminal edges 23ª and 23ᵇ, extending transversely of the panels, are preferably very substantially spaced from the respective ends of the panels themselves, say, on the order of three or four inches.

The material 23 is preferably made up in the form of a pasty or semi-plastic batch, including the poisonous ingredient which, by way of illustration, and, preferably, comprises sodium fluoride, and it preferably includes suitable ingredients such as clay and glycerine to give it body and hence, while pasty or moldable, will have little or no degree of mobility or flow under normal or usual conditions of use.

The material 23 is spread by any suitable means over the central or middle area of preferably all of the panels whose faces are to be exposed internally of the device, the material adhering to the face of the blank and thereafter remaining pasty or semi-plastic; accordingly, it does not crackle nor does it crack off of its supporting surface, and in subsequently converting the blank into the tube-like conformation the material 23 freely yields in the bending of the blank, as at the score lines 12, 13, 14 and 15, and thereafter remains intact and without crumbling off even though the walls of the tube structure are flexed or indented as might happen accidentally in ultimate handling or use of the completed device.

Preferably, however, I provide at the ends of the device suitable means to aid in the intended functioning of the device and also to improve the element of safety. In one form, this means may comprise extensions, somewhat in the nature of flaps, at the respective ends of the panels 17, 18, 19 and 20 and in Figure 2 the left-hand extensions thereof are shown at 17ª, 18ª, 19ª and 20ª, and the right-hand extensions at 17ᵇ, 18ᵇ, 19ᵇ and 20ᵇ, respectively.

These extensions may be marked off from each other along the lines of the score lines 13, 14 and 15, as by extensions of the latter, thus leaving the flap extensions at the ends of the several panels connected, at least throughout preferably a substantial extent, and if desired, the outer portions of adjacent flap extensions may be separated or cut from each other, preferably by cutting away wedgelike portions to leave a small angle of separation as at 25. Where the blank is provided with flap extensions at its ends as in Figure 2, their junction to the blank is preferably scored along the lines 26 and 27 so that they may be folded about 180° toward or against the upper face of the blank as it is viewed in Figure 2, the flap extensions being of a length such that their outermost edges reach about halfway from the score line of folding over to the adjacent bounding edge of the material 23.

After thus folding the flap extensions inwardly, the blank is next converted into tube-like form and where the latter is to be of rectangular cross-section, the folding is done about the score lines 12, 13, 14 and 15, bringing panel 16 into external overlapping relation to panel 20 as appears better in Figures 3 and 4, while the flap extensions 17ª, 18ª, 19ª and 20ª at one end and the flap extensions 17ᵇ, 18ᵇ, 19ᵇ and 20ᵇ at the other end become internally disposed, also in tube-like form but of smaller internal dimensions within the respective ends of the tube structure, being disposed partially against the respective panels 17, 18, 19 and 20, as is better shown in Figures 3 and 5.

The parts may now be secured in position and this may be done as by first wrapping a gummed tape or paper sheet 29 (Figure 1) about the central portion of the structure, and the element 29 might also serve as a label bearing printed indicia. Thereafter I preferably secure the overlapped panels 16 and 20 together by any suitable means, but preferably by way of rivets which conveniently take the form of eyelets, arranged preferably in pairs adjacent each end, each pair comprising an eyelet 30 which, as shown in Figure 3, preferably passes, not only through the panels 16 and 20, but also through the inturned extension 20ᵃ, and an eyelet 31 positioned nearer the center of the device and hence out of range of the flap 20ᵃ, thus clamping only panels 16 and 20. At the right-hand end of the device as seen in Figure 1, eyelet 30 preferably passes through panels 16 and 20 and also the flap extension 20ᵇ, eyelet 31 being beyond the end of extension 20ᵇ and hence clamping panels 16 and 20 directly.

Preferably, and as better appears in Figures 3 and 5, the internal end structures, formed in this form of construction by the flap extensions as above described, stand away somewhat from the interior walls of the tube structure, particularly at the respective inner ends thereof, providing a gap or space X which extends preferably all the way around where the poisonous material 23, in the central portion of the tube structure, also extends all the way around the internal periphery, as better appears in Figure 4. Thus, each panel that carries poisonous material on a portion of its inner face has a space X throughout a substantial portion of its end or ends, the space X being formed by the end portion of the particular panel and its folded-over flap extension. Where the various flap extensions are separated by wedgelike cutouts 25, as in Figure 2, the flap extensions have greater freedom to converge inwardly at their inner ends, thus to widen the space X at its innermost or mouth end. However, even without such convergence, the space X is nevertheless present and it may function, as is later described, even though in the course of fabrication of the device there may result some variation in the thickness of the space X and even though portions of a flap extension and of the panel toward which it is folded may be in actual contact, as for example, adjacent the rivet 30 in Figure 3.

If desired, the internal terminal structure thus provided at one end of the tube-like device by the folded flaps 17ᵃ, 18ᵃ, 19ᵃ and 20ᵃ and provided at the other end thereof by the folded flaps 17ᵇ, 18ᵇ, 19ᵇ and 20ᵇ need not be integrally formed with the blank 11 and may be built up out of separate pieces of sheet material, such as cardboard, as shown at 33 and 34 in Figure 7, the blank of the tube-like device 10 in such case being as shown in Figure 6 which reproduces the blank of Figure 2, but without the end flap extensions.

The parts 33 and 34 thus comprise a suitably proportioned piece of sheet material folded over as shown in Figure 7 to provide an external periphery geometrically similar to the internal periphery of the tube-like housing 10, in the illustration being rectangular in shape, and preferably the peripheral dimension of the devices 33 and 34 is somewhat less than the internal peripheral dimension of the tube-like housing 10 so that the parts 33 and 34 fit into the ends somewhat loosely, thus again to provide a space X as shown in Figure 8 similar to the space X above described in connection with Figures 3 and 5, excepting that in the form of Figure 5 the folding over along the score line 26, or the score line 27, of Figure 2, as the case may be, definitely closes off the space X at the end of the tube structure.

The devices 10 of Figure 1, when constructed with inserted terminal elements is assembled by steps indicated in Figure 7. Thus, the blank 11ᵃ of Figure 6, after the material 23 has been applied thereto, is converted into tube-like form, as by folding about the score lines 12, 13, 14 and 15, bringing the panel 16 into external overlapping relation to the panel 20, whence the gummed element 29 may be applied and thereafter eyelets 31, all as shown in Figure 7, applied to the overlapped panels 16 and 20. Then the folded terminal elements 33 and 34 are slid into the respective ends of the tube structure to a point where the outer edges thereof are substantially flush with the respective end edges of the tube structure, and then eyelets 30 are applied to clamp them in place, these eyelets passing not only through the overlapped panels 16 and 20, but also through one wall member of the devices 33 and 34, resulting in a cross-section at the eyelets 30, the same as that shown in Figure 3. If desired, the devices 33 and 34, of themselves made up of four connected panels folded along three score lines, as clearly indicated in Figure 7, may be provided with wedge-shaped cutouts, if desired, the same as the cutouts 25 of Figure 2, as indicated at 25 in Figure 7, thus to give at least the inner portions of the panels or sections of the devices greater freedom to converge inwardly and, as described in connection with Figure 5, thus also to widen or enlarge the inner or mouth end of the space X. And, where the device 10 of Figure 1, has the internal terminal structures described in connection with Figures 6, 7 and 8, the space X need not be uniform in thickness and may vary somewhat, particularly as a result of the relative lays which the sheet elements between which the space is formed may take or assume.

The device of Figures 1–8, when put into use provides, and presents to the roach, a long relatively narrow or constricted space or passageway, internally dark, being thus broadly similar to typical regions or spaces, such as crevices or cracks, or gaps in the building structure, kitchen installations, like tables, cabinets, sinks or the like, and in this respect the device forms what, to the roach, is simply another hide-out or place of refuge. The device is, excepting for its relatively substantial length, of small dimension and is easily and quickly positioned wherever desired, including long, narrow restricted spaces along which roaches like to roam. The internal poisonous material 23 need not function as a lure, though it may, or it may be supplemented by a substance which does function as a lure, such lures usually being something which the roach scents.

Thus the device, presenting an environment which roaches naturally seek out, by itself attracts them. If they partake of the substance 23, as they would, were they to treat the device as a hideaway, its poison will, in due course, take effect. If they simply pass through the device without eating any of the substance, they, nevertheless, may pick up on their bodies and legs some of the substance which, in due course, is either absorbed into or introduced into their system by the process of grooming, and hence ultimately takes effect.

The device will be seen to contain good safeguards, making it safe to handle it or expose it where it might be handled or to expose it in the vicinity of food products or the like. The poisonous material 23 is inaccessible, cannot be reached by the fingers of the hand, for example, and is entirely inaccessible to animals, including household pets and the like. The internal terminal structures of Figures 5 and 8 materially restrict the end opening or openings of the tube-like structure, thus cutting down on light passage therethrough and aiding in achieving the internal dark effect, and the constriction further restricts access to the interior. These internal terminal elements also strengthen and reinforce the device, aiding in resisting deformation or crushing and aiding also in resisting forced expansion or enlargement.

Preferably, the sheet material employed, if of the cardboard type, is relatively stiff and of good tensile strength, but even though flexing, warping, or bending of any of the portions carrying the material 23 were to take place, the yieldable or plastic character of the material 23 lets it follow any such distortion, without crumbling or fragmentation or dislodgement from its supporting walls. Though in the preferred construction the inserted terminal devices need not reach or extend to the layer or coating of material 23, they can function to provide definite limitations to the approach of any of the material 23 toward either open end of the device. Thus, for example, and referring to Figures 2 and 6, should there be, in course of manufacture, any material displacement of any of the material 23, as, for example, by having either or both of the boundary lines or edges 23ª—23ᵇ extend as to any panel too close to the end of the panel, the interned terminal device of Figure 5 or the inserted terminal device of Figure 8, being free from any poisonous material on its internally exposed face or faces, would cover over any such misplaced applications of the poisonous material and hence the terminal elements insure that throughout their lengths, which may be suited to particular circumstances, there is no internal exposure of poisonous material.

Should conditions arise in handling or in use of the device, such as conditions of elevated temperature, as would tend to give the poisonous material 23 mobility or flowability, or according to the nature of the material, an increased mobility, any flow or movement of the material toward the open end of the tube structure may be controlled or limited by the action of the internal terminal elements.

Thus, viewing for example Figures 5 and 8, and assuming that the panel 19 happens to be the bottom panel, movement of the pasty or plastic material 23 toward the left is retarded upon reaching the inner edge of the element 19ª in Figure 5, or of the bottom panel of the device 33 of Figure 8. Where the initial quantity of material 23 spread over the internal surface or surfaces is relatively small, as it would be when applied in a layer or coating, the just-described barrier action might suffice, for by the time the moving material has reached the barrier, its spread over the additional surface that intervenes the inner ends of the terminal device and the boundary edge or line 23ª might have so thinned out the material as to preclude material continued movement thereof.

However, should stoppage not be effected in the just-stated manner, the space X comes into action, and though it may be narrow or may be wider mouthed due to the above-mentioned convergence of the parts, the moving material 23 enters the space which thereafter continues to act somewhat in the nature of a retaining receiver therefor, whether or not the space X is open or closed at its left-hand end as viewed in Figures 1, 5 and 8. The narrowness of the space X makes it possible for the entering material to contact both faces of the sheet material that form the space X and the two faces together act to hold and retain the entered or entering material. Thus a further spreading out of any flowing material takes place, but it spreads onto or over one or both of the contiguous faces of the parts forming the space X, and not upon the internally exposed face or surface of the internal terminal element throughout whose length, suited to any particular circumstances, its internal surface or walls remain free from contamination.

Certain other advantages and certain advantageous coactions may be achieved if the general principles of construction and arrangement shown in Figures 9–12 are followed; thus, I may first build up a tube-like structure utilizing a blank like the blank 11ª of Figure 6, an adhesive tape or label 29 and eyelets or rivets 31, as was described in connection with Figures 1–8, and then make up the inserted safety terminal devices 33—34 of Figure 7 in the form shown in Figures 9–12 wherein this other form of construction is generally indicated by the reference character 36.

Thus, each of the two end terminal devices may be made out of a blank shown in development in Figure 10 and provided with score lines 37, 38 and 39 whereby the device is sub-divided into four panels 40, 41, 42 and 43 so that, when folded about the score lines, it provides a tube-like element dimensioned and shaped generally as was described in connection with Figures 3, 7 and 8 to be received into the respective ends of the tube-like housing or structure containing the poisonous material 23.

In panel 42 (Figure 10) are provided two transverse score lines 44 and 45 and lines of cutting 47, 48 and 49, thus providing a flap 50 which may be bent or folded about score line 44 and out of the plane of panel 42.

In a generally similar manner, the panel 40 is provided with transverse score lines 52 and 53 and lines of cutting 54 and 53, thus providing a flap element 55 which may be bent or folded about score line 52 and hence out of the plane of the panel 40.

In folding the four panels 40, 41, 42 and 43 into tube-like shape for entry into the ends of the tube-like housing structure, thus giving it a conformation better shown in Figure 9, these flap elements 50 and 55 are folded inwardly to a position about at right angles to their respective base or supporting panels, and where they include an additional transverse score line like the score lines 45 and 53, they are also bent or folded about these score lines and into the relationships better shown in Figures 9 and 11 from which it will be seen that flap element 50 thus has a portion 50ª forming a partial partition transversely of the interior and an end portion 50ᵇ that extends generally parallel to the longitudinal axis, while flap element 55 has a portion 55ª that forms a transverse partial partition and a portion 55ᵇ that extends lengthwise of or parallel to the longitudinal axis. As is better shown in Figures 9 and 12, these parts are relatively snugly received between the upper and lower panels 41 and 43 which may aid in holding them in these positions, depending upon the extent of frictional contact therebetween, though the resistance of the sheet material against recovery at the fold lines 44, 45, 52 and 53 should be sufficient to hold them in substantially the angular relationships shown in the drawings.

Two such devices 36 are now inserted into the respective ends of the tube structure, each with that end having the flap element 55 being entered first into the tube, whence the additional eyelet or rivet 30 (see Figure 11) is put in position to clamp together panels 16, 20 and 43, much in the same manner as described above in connection with Figure 3.

The resultant structure again provides the space X and other structural and functional relationships above described in connection with Figures 1–8, but as appears better from Figure 11, the elements 50 and 55, while not hindering free entry or exit movement of roaches or the like, as for example, along the broken line of the arrow 57, using either panel 43 or panel 41 as a floor according to which way the device is initially laid down, while the parts 50 and 55 are so proportioned and positioned as to intercept or break up any light ray entering the otherwise open end of the device. Thus, the element of darkness may be materially accentuated internally of the device where the poisonous food material 23 is positioned, and though the somewhat labyrinthean passageway effectively blocks off the major portion of light, I have found in practice that it does not hinder or deter roaches from passing therethrough and it is possible that its labyrinthean nature enhances the element of naturalness of environment to the roach. The elements 50 and 55, each providing at least one 90° bend and providing two such bends where the additional fold lines 45 and 53 are employed also give the device increased resistance to deformation or crushing when made of paper stock or fibre stock. In appearance also, they give the effect of a complete closure at the end or ends of the device, and thus improve the safety element, also offering some physical resistance and restriction against attempts to explore the interior as, for example, by the finger of a hand.

The space X functions as described above in connection with Figures 1–8, and if it is desired to have the inner end portions of the inserted safety terminal devices, in the form of Figures 9–12, converge inwardly, slits or cutouts 25, like those of Figures 2 and 7, may be provided, at the inner end portions of the score lines 37, 38 and 39, of Figure 10, the insert then appearing somewhat as in Figure 9.

As above indicated, the device may be given a cross-sectional shape other than rectangular or four-sided and, by way of illustration, its cross-sectional shape, instead of being polygonal, may be curved or circular, as shown by way of illustration in Figures 13–14. Thus the blank may take the form indicated at 11$^b$ in Figure 13, being in general shaped much the same as the blank 11 of Figure 2, particularly where it is preferred that the internal safety terminal elements be formed integrally with the blank itself, instead of separately and then inserted, though it will be clear that the latter procedure may, if desired, be adopted, as in the case of the form of Figures 6, 7, and 8.

Accordingly, the blank 11$^b$ of Figure 13 may be shaped in general as shown in that figure, being provided with transverse fold lines 26 and 27 and a suitable number of flap extensions 60 preferably at each end thereof and also preferably shaped somewhat as shown in Figure 13, being separated by slits or cutouts 25. It is shaped to leave a longitudinally extending marginal portion 61 to function, like the panels 16 of Figures 2 and 6 as an overlap and the poisonous material 23 is applied to an area limited lengthwise by the boundary lines 23$^a$ and 23$^b$ which extend, in relation to the proportion of the other parts, preferably along spacings as described above in connection with Figures 1–12, but preferably also is limited by longitudinally extending boundary lines 23$^c$ and 23$^d$ both of which are spaced substantially from the longitudinal edges of the blank, preferably by an amount commensurate with the width of the overlap portion 61.

The flaps 60 at the two ends are folded inwardly about their respective fold lines 26 and 27, whence the blank is converted into tube-like conformation as by rolling it up into cylindrical form, bringing the panel or overlap portion 61 into overlapping relation and externally of the other longitudinal end portion of the blank, as is better shown in Figure 15, these overlapping portions being thence secured together in any suitable or desired way, including, if desired, a gummed tape or sheet element 29 to hold it in tube-like shape, whence it may be put to use as will now be clear in view of what has been above said in connection with, particularly, Figures 1–8.

Preferably, however, the flap extensions 60 are provided with lines of cutting as indicated in Figure 13 at 63, being generally U-shaped in conformation, thus to form tabs or tongues 64 which, preferably before rolling the blank up into tubular form and more conveniently also before folding the parts 60 about their respective fold lines 26 and 27, are pushed out of the plane of their respective flap extensions and folded, in a direction away from the observer looking at Figure 13, into a substantially 90° relationship, so that when the tube structure is completed, these tabs 64 project inwardly at substantially 90° toward the axis of the tube structure, appearing as shown in Figures 14 and 15, and functioning to aid in blocking off light rays from entry into the interior and thus aiding in creating the element of darkness interiorly of the tube structure. In a peripheral direction, they are sufficiently spaced from each other to give adequate freedom of entry or exit to the insect. Preferably, these tabs are set nearer the outer ends of the internal safety devices, as appears better in Figure 14, thus leaving a substantial unbroken axial length of the elements 60 projecting inwardly from each end of the tube structure.

The space X is again present as is indicated in Figures 14 and 15, functioning as was above described in connection with Figures 1–12, it being noted that the narrow slits or cutouts 25 may, or may not, be used as desired, though when employed they may function, as in the other forms, to provide for greater freedom of convergence inwardly of the inner portions of the safety terminal devices and thus provide a wider mouth for the entry of such of the poisonous material 23 as may reach them after spreading over the intervening uncoated internal surfaces of the tube structure respectively to the left and to the right of the boundary lines 23$^a$ and 23$^b$.

Since roaches, particularly, frequent places where there is piping and frequently use as a passageway the space or crack about a pipe where it passes through a floor, wall, partition or the like, I find it advantageous to bring my device into direct coaction with a pipe or like element, and since such elements are usually cylindrical, the cylindrical tube structure above described is peculiarly adaptable for such coacting relationship with a length of pipe, and in Figure 15 the above-described device is shown in relation to a pipe 66, the inturned tabs 64 may conveniently serve to space the internal wall of the tube structure from the external cylindrical surface of the pipe, and accordingly insure a continuous annular passageway between the inside wall of the tube structure and the outside of the pipe.

Depending upon the specific proportionnig of the parts, including the length of the inturned tabs 64, some or all of the latter may be in engagement with the pipe and a more or less close approximation to concentricity of the two structures provided. But the tabs 64, in any case, prevent those portions of the internal surfaces of the tube structure that carry the poisonous material 23 from getting close enough to the pipe 66 to bring about a contamination of the latter or a transfer by contact of poisonous material to the pipe itself.

Where applied to piping, the device is preferably made up in different sizes as to width in a circumferential direction of the blank 11b and as to the length of the tabs 64, thus to suit best various sizes of pipes met with in practice. Thus, for example, one size of device may be made up and proportioned to be suitable for ½" and ¾" pipe, another size made up for 1" and 1¼" pipe, and so on..

When rolled into cylindrical form, I preferably provide suitable stop elements to fix the extent of overlap of the portion 61 and hence to fix the internal diameter, such an arrangement being preferable and desirable where the device is not initially permanently secured in tube-like form and where it has to be positioned about a pipe. In the latter case, it may be shipped to the place of installation in flat form or it may be shipped in tubular form, whence it is opened up or unrolled and then placed about the pipe.

A convenient and suitable arrangement of this character comprises two elements generally indicated by the reference characters 67 and 68 to function as both stop and fastening elements, and each may comprise a washer 69 of a material like relatively stiff cardboard or fibre board secured to the blank 11b as by a rivet or eyelet 70, being positioned in longitudinally spaced relation along the lower edge of the blank 11b as seen in Figure 13, with the washer element 69 on the underside.

Accordingly, when the flat blank is rolled into cylindrical shape, the overlap portion 61 is slid under the two spaced washers 69 and brought up against the shanks of the rivets or eyelets 70 as appears better in Figure 15. Thence, the adhesive sheet member 29 may be put in place to fix the blank against unrolling or unfolding, and preferably I also provide, for each of the devices 67 and 68 and also clamped by the clamping action of the rivet 70, a string or cord 71 which, after tucking the overlap 61 under the washers 69 may then be wrapped once or more times about the tube structure and its free end then wrapped about the shank of the rivet in under the washer 69, the wedging action of the parts upon this latter portion of the string or cord holding it against unwinding.

Such a fastening arrangement is thus detachable. For example, for factors of safety against contamination, the device may be shipped in tube form with the just-described fastening put in place, whence it may be used simply as a tube structure, whether or not the gummed element 29 is superimposed, or, of it is to be applied about the pipe, the fastenings may be easily undone by unwinding the string, the device put about the pipe, and the fastenings quickly restored. In the latter case also, removability of the device from the pipe is quickly facilitated, for purposes of replacement or discard.

Where a detachable fastening is employed, it is preferable to restrict the area of application of the poisonous material 23 transversely of the blank, as by the boundary lines 23c—23d already above described. Such restricted initial application thus leaves free substantial upper and lower marginal portions of the blank 11b, as viewed in Figure 13, to lessen the chance of contact with the substance 23 in unrolling or rolling up the device. Also, and as will appear better from Figure 15, egress of any of the substance, should it become mobile, by way of the joint formed longitudinally at the overlap 61, is restricted since the material, if it partakes of any movement or flow, has to spread itself over a substantial area, thus becoming thinned out, before it reaches the joint, and if it reaches and enters the joint, retardation of flow takes place by an action like that above described in connection with the spaces X at the internal safety terminal devices.

Where the cylindrical form of construction of Figures 13-15 is employed, it will, of course, be understood that it is preferable to make it up in relatively small diameter, a diameter on the order of 1" or so, if is to be used independently of an interior cylindrical element like the pipe 66 of Figure 15, thus to enhance the element of darkness within the tube structure, and that it is preferable, where an element like pipe 66 of Figure 15 is to be employed, to have the annular space between the tube structure and the internal cylindrical element of relatively small dimension, on the order, for example, of ½", in order also to enhance the element of darkness in the annular space. In both instances, it is preferable to have the flap or tab elements 64 function as above described to diminish the amount of light entering the space in which the poisonous material 23 is accessible.

Thus it will be seen that there has been provided in this invention a device in which the various objects above noted together with many thoroughly practical advantages are successfully achieved. The device is of dependable, durable and inexpensive construction, of efficient and safe action, and may be disposed or positioned in a wide variety of locations, and with a high factor of safety. Moreover, it will be seen that the device is well adapted to meet the widely varying conditions of practical use.

As many possible embodiments may be made of the above invention and as many changes might be made in the embodiment above set forth; it is to be understood that all matter hereinbefore set forth or shown in the accompanying drawings is to be interpreted as illustrative and not in a limiting sense.

I claim:

1. A device of the character described comprising a housing made of a sheet material and being of tube-like conformation, having cross-sectional dimensions that are small compared to its length to provide an interior relatively dark, an area of its internal walls bearing a life-destroying substance, said tube-like housing having safety terminal structures positioned internally at its respective ends, each terminal structure comprising means of sheet material also of substantially tube-like conformation with an external peripheral dimension substantially the same as the internal peripheral dimension of said tube-like housing and of a length to extend a substantial distance inwardly from the end of said tube-like housing, said tube-like terminal structures having flap or tab elements projecting inwardly thereof at an angle to the axis of said tube-like housing for partially closing off the ends of the latter and to break up light rays entering the tube-like housing from the ends.

2. A device as claimed in claim 1 in which said tube-like housing and said tube-like terminal structures are in cross-section in the form of a four-sided right-angled polygon of which two opposite faces form the upper and lower sides and the two remaining opposite faces form the remaining two sides of the tube-like housing, said tab or flap elements extending from one of said sides toward the opposite side and are relatively snugly received between the two remaining sides.

3. A device as claimed in claim 1 in which said tube-like housing and said terminal structures are substantially cylindrical, the tab or flap elements of said terminal structures extending in the general direction of a radius and being of insufficient peripheral extent to completely block off the ends of the tube-like housing for passage therethrough of insects.

4. A device as claimed in claim 1 in which the sheet material of said internal terminal structures is separate from the sheet material of said tube-like housing, with means securing said structures in place internally of said tube-like housing and adjacent the ends thereof.

5. A device as claimed in claim 1 in which the sheet material of said terminal structures is integral with the sheet material of said tube-like housing, the former comprising extensions of the latter folded inwardly toward or against the inside wall of said tube-like housing along its end portions.

6. A device as claimed in claim 1 in which said tube-like housing and said internal terminal structures are cylindrical in shape, said tab or flap elements extending substantially along respective radii, but being shorter than the radius, thereby to act as spacers for holding the internal surfaces of said tube-like housing and of said terminal structures from engagement with, and in spaced relation to, an internal cylindrical element like a pipe.

7. A device as claimed in claim 1 in which said tube-like housing is formed out of the sheet material by converting a blank of the latter into tube-like conformation with longitudinal edge portions of the blank brought into overlapping relation, with means operating upon said overlapping end portions to hold them against separation and thus to take part in retaining the tube-like conformation of said internal terminal structures.

8. A device as claimed in claim 1 in which said tube-like housing is formed out of the sheet material by converting a blank of the latter into tube-like conformation with longitudinal edge portions of the blank brought into overlapping relation, with means detachably securing said overlapping portions together, whereby the tube-like housing with its internal terminal structures may be placed about a pipe or the like and the overlapping portions secured together, said flap or tab elements spacing the internal surfaces of the device and also said life-destroying substance from the pipe.

9. A device of the character described comprising a housing made of a sheet material and being of tube-like conformation, having cross-sectional dimensions that are small compared to its length to provide an interior relatively dark, an area of its internal walls bearing a life-destroying substance, said tube-like housing having safety terminal structures positioned internally at its respective ends, each terminal structure comprising means of sheet material also of substantially tube-like conformation with an external peripheral dimension substantially the same as the internal peripheral dimension of said tube-like housing and of a length to extend a substantial distance inwardly from the end of said tube-like housing, the respective bounding lines of the area of said substance being spaced a substantial distance from the respective inner end edges of said internal terminal structures to provide intervening areas of substantial axial dimension along which spread of said substance must first take place in the event of flow, before it reaches said terminal structures.

10. A device of the character described comprising a housing made of a sheet material and being of tube-like conformation, having cross-sectional dimensions that are small compared to its length to provide an interior relatively dark, an area of its internal walls bearing a life-destroying substance, said tube-like housing having safety terminal structures positioned internally at its respective ends, each terminal structure comprising means of sheet material also of substantially tube-like conformation with an external peripheral dimension substantially the same as the internal peripheral dimension of said tube-like housing and of a length to extend a substantial distance inwardly from the end of said tube-like housing, the respective bounding lines of the area of said substance being spaced a substantial distance from the respective inner end edges of said internal terminal structures to provide intervening areas of substantial axial dimension along which spread of said substance must first take place in the event of flow, before it reaches said terminal structures, the sheet materials of said terminal structures being free from continuous contact or engagement with the contiguous inside surfaces of said tube-like housing, thereby to provide relatively narrow spaces for the entry thereinto of said substance should its spread, by flow, reach said terminal structures.

11. A device of the character described comprising a housing made of a sheet material and being of tube-like conformation, having cross-sectional dimensions that are small compared to its length to provide an interior relatively dark, an area of its internal walls bearing a life-destroying substance, said tube-like housing having safety terminal structures positioned internally at its respective ends, each terminal structure comprising means of sheet material also of substantially tube-like conformation with an external peripheral dimension substantially the same as the internal peripheral dimension of said tube-like housing and of a length to extend a substantial distance inwardly from the end of said tube-like housing, the respective bounding lines of the area of said substance being spaced a substantial distance from the respective inner end edges of said internal terminal structures to provide intervening areas of substantial axial dimension along which spread of said substance must first take place in the event of flow, before it reaches said terminal structures, the sheet materials of said terminal structures being free from continuous contact or engagement with the contiguous inside surfaces of said tube-like housing, thereby to provide relatively narrow spaces for the entry thereinto of said substance should its spread, or flow, reach said terminal structures, the inner end portions of said terminal structures being convergent inwardly toward the axis of said tube-like housing to provide wider mouths for the inner open ends of said spaces.

12. A device of the character described comprising a tube-like housing of substantial length having a life-destroying substance spread over a restricted area of its internal walls, a bounding line of said area being spaced substantially from an end of said housing, said end of said housing having internally thereof a safety terminal structure for restricting the area of the opening at said end and thereby diminish the amount of light entering therethrough, said terminal structure extending inwardly from said end of said housing throughout a substantial distance toward said bounding line and presenting a surface exposed to the interior of said housing that is free from life-destroying substance.

13. A device as claimed in claim 12 in which said terminal structure and the contiguous wall of said tube-like housing provide therebetween a space for the entry of said life-destroying substance in the event that the latter partakes of flow in a direction toward said end of said housing.

14. A device as claimed in claim 12 provided with means partially blocking off the opening presented at said end of said tube-like housing for additionally cutting off light rays from entry into the interior of said housing.

15. A device as claimed in claim 12 in which said terminal structure is made of a sheet material which has flap or tab means bent to project into the opening presented by said end of said tube-like housing to retard entry of light.

16. A device as claimed in claim 12 in which there is a means forming an internal wall spaced inwardly from and about the internal wall of said tube-like housing and said terminal structure, with means holding them in spaced relation, thereby providing a relatively narrow peripherally continuous space therebetween for entry of insects and for access thereby to said substance.

17. A device as claimed in claim 12 in which the cross-sectional dimensions of said tube-like housing and terminal structure are greater than those of an extraneous part like a pipe, whereby said tube-like housing and terminal structure are receivable over a pipe, and means for holding the tube-like housing and terminal structure spaced from the surface of the pipe.

18. A device as claimed in claim 12 in which said tube-like housing is made up of a flexible sheet material converted into tube-like conformation with two longitudinal edge portions of the blank brought into overlapping relation, and means for securing said overlapping portions together.

19. A device as claimed in claim 12 in which said tube-like housing is made up of a flexible sheet material converted into tube-like conformation with two longitudinal edge portions of the blank brought into overlapping relation, and means readily operated manually for holding said portions in overlapping relation and for holding the blank against opening up out of tube-like conformation, whereby said tube-like housing may be readily assembled about an extraneous parts, such as a pipe.

ALEX WEIL.